Nov. 25, 1958
S. D. DENISON
2,861,366
VEHICLE ACTUATED GATE
Filed Dec. 21, 1956
3 Sheets-Sheet 1
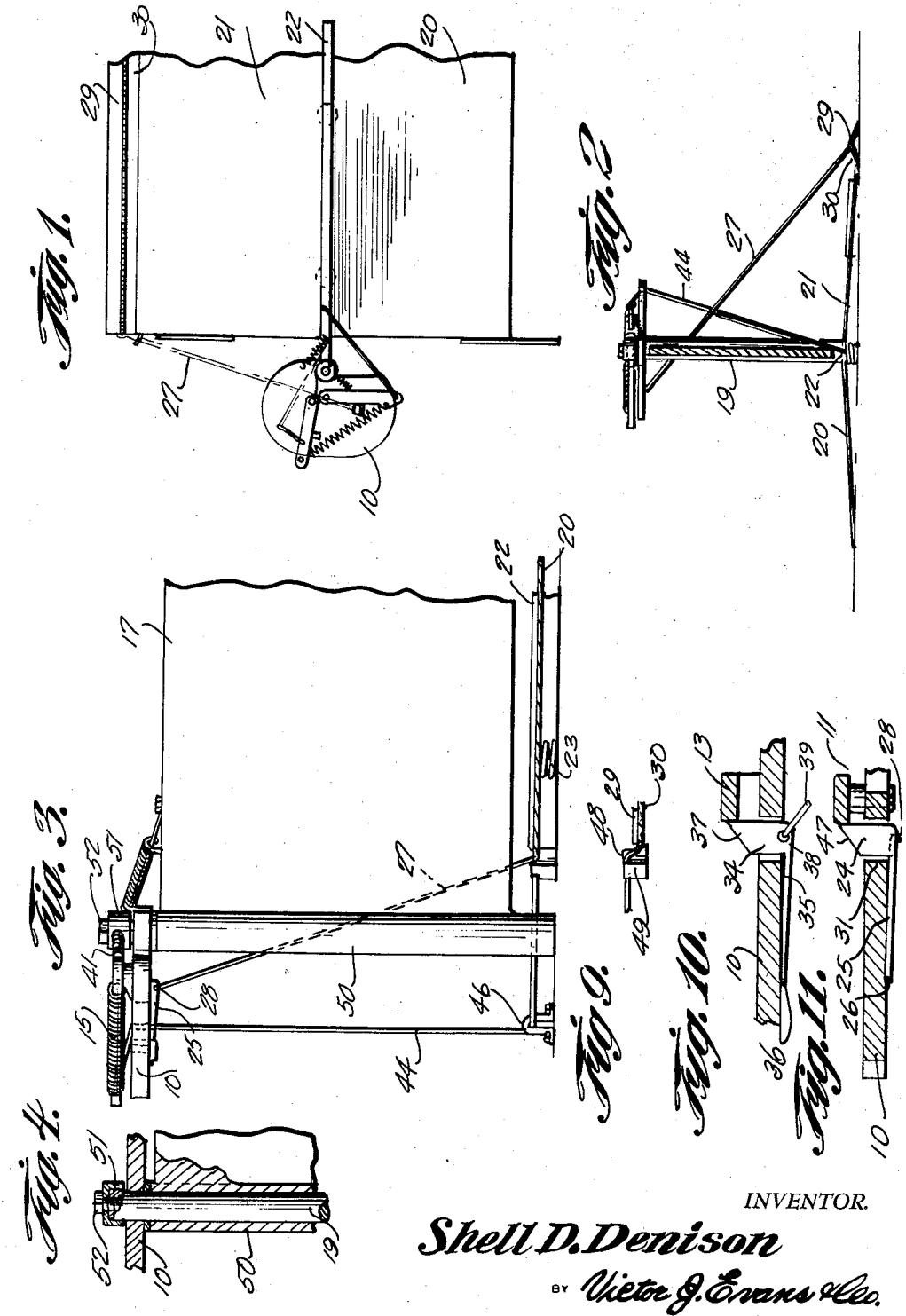
INVENTOR.
Shell D. Denison
BY Victor J. Evans & Co.
ATTORNEYS Nov. 25, 1958  S. D. DENISON  2,861,366
VEHICLE ACTUATED GATE
Filed Dec. 21, 1956  3 Sheets-Sheet 2
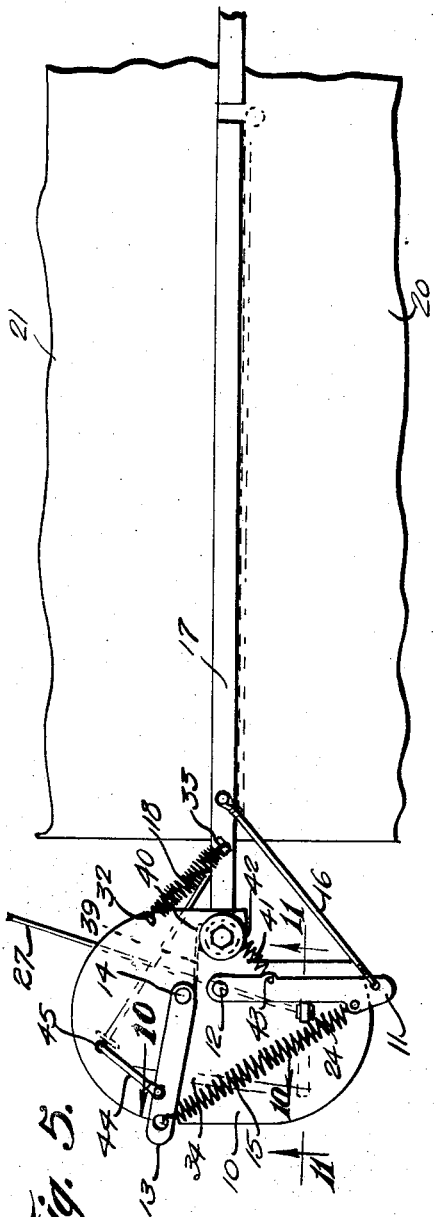
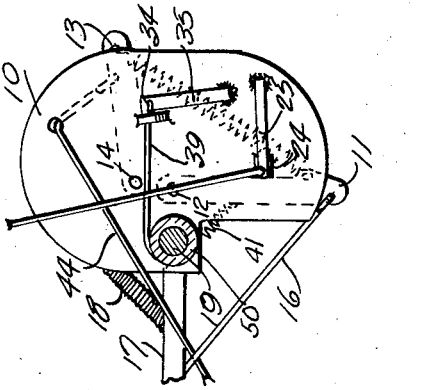
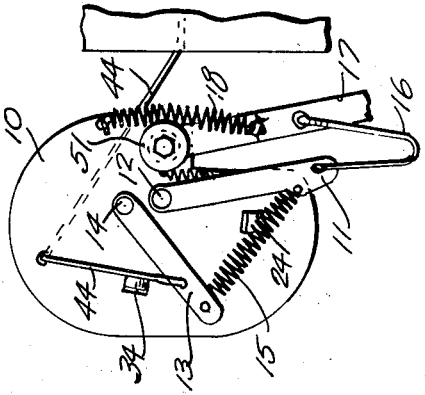
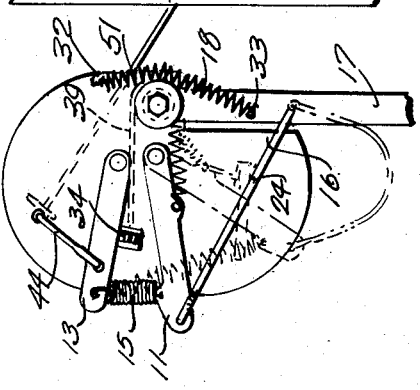
INVENTOR.
*Shell D. Denison*
BY *Victor J. Evans & Co.*
ATTORNEYS Nov. 25, 1958  S. D. DENISON  2,861,366
VEHICLE ACTUATED GATE
Filed Dec. 21, 1956  3 Sheets-Sheet 3
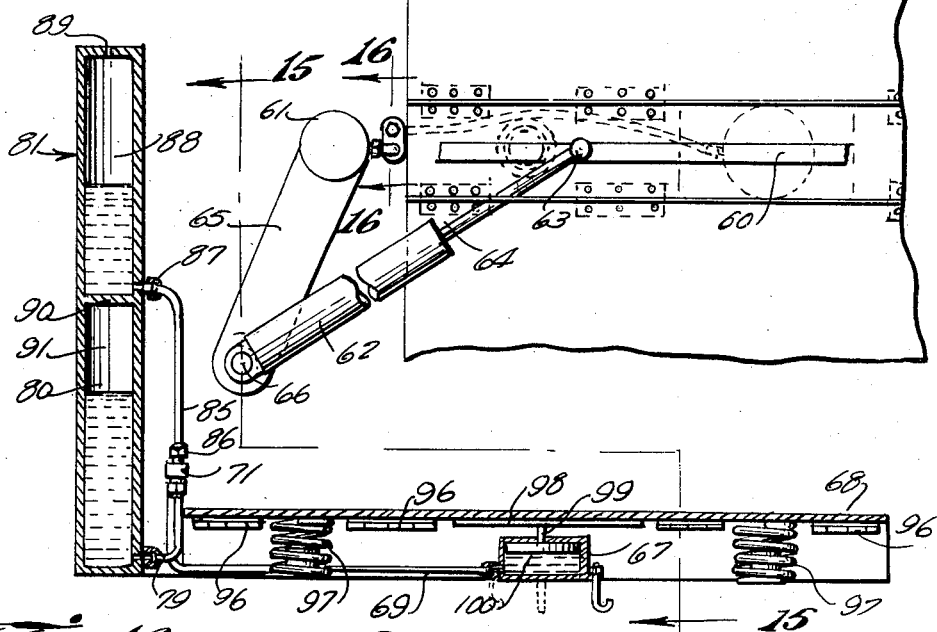
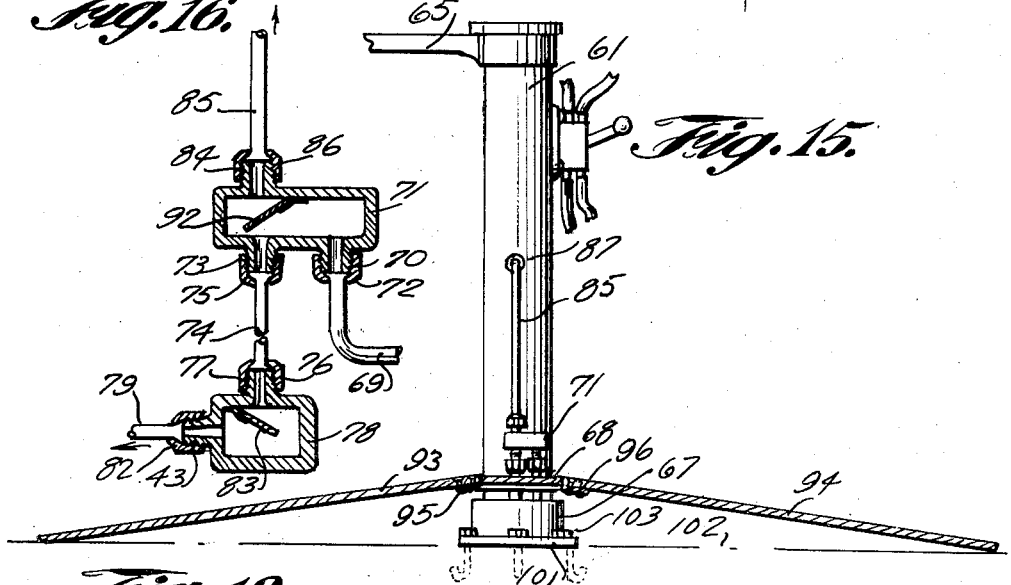
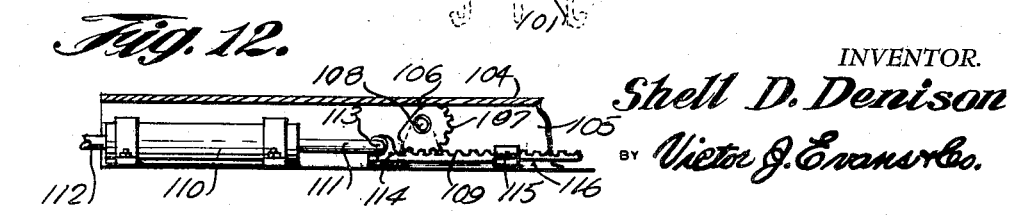
INVENTOR.
Shell D. Denison
BY Victor J. Evans & Co.
ATTORNEYS

United States Patent Office 2,861,366
Patented Nov. 25, 1958

2,861,366

VEHICLE ACTUATED GATE

Shell D. Denison, Fort Sumner, N. Mex.

Application December 21, 1956, Serial No. 629,954

4 Claims. (Cl. 39—18)

This invention relates to mechanical or hydraulically actuated gates wherein the travel of a vehicle over ramps leading to and extending from a gate opens the gate as the vehicle approaches and closes the gate as the vehicle travels away from the gate, and in particular an assembly of gate actuating levers and springs positioned on a plate mounted at the upper end of a post at one side of a gate whereby as the front wheels of a vehicle travel upwardly on a ramp extended from one side of the gate the lever assembly is actuated to open the gate and as the wheels travel downwardly on the ramp extended from the gate the levers are actuated to close the gate.

The purpose of this invention is to provide mechanical and hydraulic means for opening and closing a gate as a vehicle passes therethrough.

Various types of gate opening and closing devices have been provided, particularly for garage and farm use, however, it is difficult to design a gate operating mechanism that is self-contained and that is adapted to be placed on a roadway where electric power is not available or in gates between fields of a form also where power is not available.

With this thought in mind this invention contemplates a gate operating mechanism including a pair of levers pivotally mounted on a mounting plate on a post at one side of a gate opening with springs connecting the levers and other parts and with dogs adapted to be actuated to release the levers by the weight of a vehicle on ramps extended from opposite sides of the gate.

The object of this invention is, therefore, to provide a gate actuating mechanism that is adapted to be installed on a post at the side of a gate and connected to ramps extended from opposite sides of a gate in which the approach of a vehicle opens the gate and the weight of the vehicle leaving the gate releases levers by which the gate is closed.

Another object of the invention is to provide instrumentalities for actuating a gate by the weight of a vehicle in which the device may be operated by mechanical or hydraulic means.

A further object of the invention is to provide motor vehicle operated gate actuating instrumentalities for opening and closing a gate in which the device is of a simple and economical construction.

With these and other objects and advantages in view the invention embodies a gate extended between posts with inclined ramps extended downwardly from opposite sides of the gate structure and with an assembly of levers and springs pivotally connected to a mounting plate on a post positioned at one side of the gate wherein with dogs positioned in the mounting plate actuated by weight of a vehicle on the ramps the gate opens as the vehicle rides upwardly on a ramp at one side and closes as the vehicle rides downwardly on the ramp at the opposite side.

Other features and advantages of the invention will appear from the following description taken in connection with the drawings, wherein:

Figure 1 is a plan view showing one side of a gate with operating instrumentalities positioned on a post to which the gate is hinged, with ramps extending from opposite sides of the gate, and with portions of the ramps broken away.

Figure 2 is a longitudinal section through the gate operating mechanism showing the cables for releasing levers of the operating mechanism extend from the device through portions of the ramps.

Figure 3 is an end elevational view showing the mounting of the gate and operating mechanism at the side of the gate opening in which the gate is hinged and with parts broken away.

Figure 4 is a cross section showing the pivotal mounting of the upper portion of the gate in the mounting plate of the operating mechanism with parts of the elements broken away.

Figure 5 is a plan view of the lever assembly for operating the gate, showing the gate extended therefrom and the ramps extended from the gate, parts of the ramps being broken away and the operating mechanism being shown on an enlarged scale.

Figure 6 is a plan view similar to that shown in Figure 5 illustrating the positions of the parts with the gate in the open position.

Figure 7 is a plan view also similar to that shown in Figures 5 and 6 showing the relative positions of the levers with the gate starting its closing movement.

Figure 8 is a view looking upwardly toward the under surface of the mounting plate with the parts in the positions shown in Figure 5 wherein the gate is closed.

Figure 9 is a view showing the connection of one of the cables to parts of the ramps.

Figure 10 is a cross section taken on line 10—10 of Figure 5 showing the mounting of one of the dogs for holding one of the operating levers in position, the parts being shown on an enlarged scale.

Figure 11 is a cross section taken on line 11—11 of Figure 5 also showing the mounting of the dogs for retaining the gate operating lever in position upon the mounting plate, the parts also being shown on an enlarged scale.

Figure 12 is a cross section through one side of the ramp with parts broken away illustrating a cylinder for imparting pressure to fluids of the hydraulic system as the ramp moves downwardly with the weight of a vehicle.

Figure 13 is a vertical section through a post at one side of the device and also through the ramp directly below the gate whereby the ramp is urged upwardly by springs, and a pressure cylinder is provided for supplying fluid under pressure to a reservoir in a post at one side of the gate opening.

Figure 14 is a plan view of the assembly shown in Figure 13.

Figure 15 is a longitudinal section through a roadway showing a post with the ramps extended from opposite sides and with a hydraulic cylinder positioned to be actuated by the ramps for supplying fluid under pressure.

Figure 16 is a vertical section through the valve assembly at the lower end of the post at one side of the gate shown in Figure 13 with the parts shown on an enlarged scale and with parts broken away.

Referring now to the drawings wherein like reference characters denote corresponding parts the improved gate operating mechanism of this invention includes a mounting plate 10, a gate control lever 11 pivotally mounted on the plate 10 with a pin 12, an operating lever 13 pivotally mounted on the plate 10 with a pin 14, a spring 15 connecting the lever 13 to the lever 11, a cable 16 connecting the lever 11 to a gate 17, a spring 18 connecting the gate to the mounting plate 10, a post 19 on which the plate 10 is mounted and a ramp including inclined sections 20 and 21 extended from opposite sides of the gate.

The sections 20 and 21 of the ramp are hinged to a center strip 22, as illustrated in Figure 2 and the ends of the sections are supported by springs 23 which extend transversely across the ramp retaining the ends of the sections at the sides of the gate in oppositely disposed positions and spaced from the ground.

The lever 11 is retained in the position shown in Figure 5, wherein the gate is in the closed position, by a dog 24 pivotally mounted by an arm 25 on the under surface of the mounting plate 10 with a pin 26 and the dog is connected by a cable 27, which is attached to the lower portion of the dog at the point 28, to a raised portion of the section 21 of the ramp as indicated by the hinged plates 29 and 30.

Upon the approach of a vehicle to the gate the forward wheels traveling over the hinged plates 29 and 30 depress the plates drawing the cable 27 downwardly and at the same time drawing the dog 24 downwardly into an opening 31 in the mounting plate 10 whereby the lever 11 is released and the spring 15 draws the lever 11 from the position shown in Figure 5 to that shown in Figure 6 in which movement of the lever, being connected to the gate 17 with the cable 16 draws the gate from the position shown in Figure 5 to that shown in Figure 6 wherein the gate is open. In this movement the spring 18, one end of which is attached to the plate 10 at the point 32 and the other to the gate at the point 33 is extended so that upon release thereof the gate will be drawn by the spring 18 to the closed position.

The lever 13 is retained in the position shown in Figures 5 and 6 by a dog 34 which is carried by a spring 35 on the under surface of the plate 10, as shown in Figure 10, and the dog is actuated by a cable 39 which is attached to the dog at the point 38. The end of the cable 39 opposite to the end attached to the dog 34, is connected to a hub 50 for the gate 17 at the point 40 and upon rotation of the hub of the gate on the post in the opening movement of the gate the cable 39 draws the dog 34, carried on the end of a spring 35, that is secured to the under surface of the plate 10 by solder, welding, or the like, as shown at the point 36, downwardly and the dog, the upper end of which is provided with a beveled surface 37 is provided with an opening 38 to which the cable 39 is connected and with the opposite end of the cable connected to the post 19 at the point 40 the opening movement of the gate, which rotates the hub on the post 19 in a clockwise direction draws upon the cable 39 pulling the dog 34 downwardly, releasing the lever 13.

Upon release of the lever 13 a spring 41 positioned with one end 42 attached to a cap 51 on the upper end of the post 19 and the opposite end 43 attached to the lever 11 returns the lever 11 to the position shown in Figure 5 and in this movement the spring 18 returns the gate 17 to the closed position, also as shown in Figure 5.

After being released by the dog 34 the lever 13 is returned to the position shown in Figure 5 by a cable 44 which extends through an opening 45 in the mounting plate 10 downwardly through a yoke 46 and inwardly through the strip 22 which is the high portion of the ramp, between the sections 20 and 21, as shown in Figure 3, whereby with the cable attached to the opposite side of the gate opening or highway the weight of the vehicle on the plate 22 forces the cable 44 downwardly pulling the lever 13 from the released position back to the position shown in Figure 5, wherein, after the vehicle has passed over the ramp the springs 23 move the plate 22 upwardly releasing the cable 44 and the lever 13 is retained in position by the dog 34. In this movement the lever 13 slides upwardly over the inclined or beveled surface 37 to the position shown in Figure 2 in which the lever is again retained in position by the dog. The dog 24 is also provided with the beveled surface 47 over which the strip 22 which is the lever 11 slides in the return movement in which the gate travels from the open to the closed position.

The cable 27 extended from the opening 28 of the dog 24 to the outer raised section of the ramp formed by the plates 29 and 30 is connected to an arm 48, as shown in Figure 9, and the arm is rotatably mounted in a bearing 49 whereby the connection between the plates 29 and 30 is free to swing upwardly or downwardly and the vehicle approaching the ramp moves the plates 29 and 30 downwardly drawing the cable 27 and actuating the dog 24 to release the lever 11 as the vehicle starts on the ramp.

The gate 17 is provided with a hub 50 through which the post 19 extends, and as illustrated in Figure 4, the upper end of the post extends through the mounting plate 10, with the upper end provided with a cap 51 that is secured in position by a cap screw 52. The gate 17 may be a single gate or it may be a portion of a double gate with a similar portion mounted on the opposite side of the roadway that is operated simultaneously with the gate 17. The gate 17 as a single gate or as a portion of a double gate can be operated in each direction of travel of a vehicle over the ramp.

In the design illustrated in Figures 12 to 16 inclusive a gate 60 pivotally mounted on a post 61 is actuated by a hydraulic cylinder 62 connected to the gate at the point 63 through a connecting rod 64, and pivotally mounted on an arm 65 extended from the post 61 by pin 66. Fluid is supplied by a cylinder 67, providing a pump positioned below the center plate 68, of the ramp, and the discharge of the pump is connected by a tube 69, to a threaded nipple 70 of a valve body 71 to which the tube is connected with a coupling 72. The discharge of the valve body 71 is provided with a threaded nipple 73 to which a tube 74 is secured with a coupling nut 75 and the opposite end of the tube 74 is connected by a coupling nut 76 to a nipple 77 of a check valve body 78. The valve body 78 is connected by a tube 70 to a pressure chamber 80 of a post 81.

The tube 79 is connected to the valve body 78 with a coupling 82 that is threaded on a nipple at one end of the valve body and the valve body is provided with a swinging plate 83 that prevents fluid passing through the tube 74 to the body 71 and that permits fluid under pressure to pass from the body 71 to the check valve body 78.

The valve body 71 is also provided with a nipple 84 to which a tube 85 is connected with a coupling 86 and the upper end of the tube 85 is connected by a coupling 87 to a nipple extended from the lower end of the storage chamber 88 positioned in the upper part of the tubular casing. The upper end of the casing is provided with a vent 89. The casing is provided with a partition 90 with an air pressure chamber 91 below the partition, and, as shown in Figure 13, the lower part of the storage reservoir 80 is provided with oil, water, or the like.

Opposite ends of the cylinder 62 are connected to opposite ends of the control mechanism which is supplied by fluid under pressure from the reservoir 80. The valve body 71 is also provided with a flap or plate 92 which prevents movement of fluid upwardly through the tube 85.

The opposite ends of the cylinder 62 are connected to a control device adapted to be tripped by the weight of a vehicle passing over the ramp. Fluid pumped by the cylinder 67 is stored in the chamber 80 under pressure and readily applied to the cylinder 62 for opening and closing the gate.

The cylinder 67 is positioned below the plate 68 of the ramp in which side sections 93 and 94 are hinged to sides of the plate 68 with hinges 95 and 96, respectively, and the sections 93 and 94 and also the plate 68 are resiliently urged upwardly by springs 97. The cylinder 67 is provided with an upper plate 98 carried by a piston rod 99 extended from a piston 100 in the cylinder and the lower end of the cylinder is provided with a flange 101 that is secured to a foundation 102 with bolts 103.

With the parts assembled as illustrated and described a vehicle approaching the gate and traveling upwardly on one of the plates 93 or 94 moves the plate 68 downwardly applying pressure to the fluid in the cylinder 67 and the fluid under pressure is transmitted, by suitable control means to opposite ends of the cylinder 62 whereby the gate is opened by a clockwise or counterclockwise movement depending upon the end of the cylinder 62 to which the fluid is supplied. After passing through the gate the fluid under pressure stored in the reservoir 80 returns the gate to the closed position.

In the design shown in Figure 12 a plate 104 of a ramp 105, riding upon the upper edge 106 of a segment 107 rotatably mounted on a shaft 108, rotates the segment about the shaft, sliding a rack bar 109, the teeth of which mesh with the teeth of the gear segment 107 toward a cylinder 110 from which a piston rod 111 extends whereby with the opposite end of the cylinder 110 connected by a tube 112 to the storage chamber 80 of the cylindrical post 81 fluid is pumped into the storage chamber 80 each time a vehicle passes over the ramp. The extended end of the connecting rod 111 is connected by a pin 113 to a lug 114 on the rack bar 109 and, also as shown in Figure 12 the rack bar is slidably mounted in bearings 115 on a base 116.

The pump or pressure cylinder may, therefore, be of any suitable type or design and may be positioned below the ramp or at any suitable point whereby downward movement of the central portion of the ramp actuates the pump cylinder to supply fluid under pressure to the pressure chamber 80. By this same means fluid under pressure in the chamber 80 is connected to suitable means for opening and closing the gate as desired.

With the parts assembled as illustrated and described a motor vehicle approaching the gate and with the front wheels traveling on the ramp draws the dog 24 downwardly releasing the lever 11 whereby the spring 15 draws the gate 17 from the position shown in Figure 5 to the position shown in Figure 6; or where the hydraulic system is used the weight of the vehicle on the ramp places the fluid under pressure and the fluid under pressure transmitted to the cylinder 62 opens the gate.

By this means the gate is opened as the vehicle approaches and as the vehicle leaves the ramp the dog 34 is drawn downwardly to release the lever 13 to permit the spring 18 to draw the gate 17 back to the position shown in Figure 5 and after this movement the cable 44 draws the lever 13 back over the inclined surface of the latch 34. With the lever in the original position, as shown in Figure 5, the lever 11 is positioned against the dog 24.

By the same means fluid pressure is controlled so that the pressure applied to the ends of the cylinder 62 of the design shown in Figures 13, 14, 15 and 16 is adapted to close or open the gate. The gate 60 is similar to the gate 17, being a single gate or a double gate and operated in each direction as previously described for the operation of the gate 17.

What is claimed is:

1. A gate actuator comprising a post, a gate pivotally mounted on the post, a gate control lever also pivotally mounted on the post, means connecting the control lever to the gate, an operating lever also pivotally mounted on the post, resilient means connecting the control lever to the operating lever, resilient means connecting the gate to the post, a ramp positioned below the gate, means mounted on the post for retaining the control lever in position with the gate closed, means connected to the ramp and the post for actuating the retaining means of the control lever to release the control lever to open the gate, means mounted on the post for retaining the operating lever in position with the gate open, and means connected to the gate and to the retaining means for releasing the operating lever whereby the gate is returned to the closed position and wherein the operating lever is returned to the cocked position.

2. A gate actuator comprising a post, a gate pivotally mounted on the post, a mounting plate positioned on the upper end of the post, a gate control lever pivotally mounted on the plate, means connecting the control lever to the gate, an operating lever also pivotally mounted on the mounting plate, resilient means connecting the control lever to the operating lever, resilient means connecting the gate to the mounting plate at a point spaced from the post, a ramp positioned below the gate, means mounted on the plate for retaining the control lever in position with the gate closed, means connected to the ramp and to the retaining means for actuating the retaining means of the control lever to release the control lever and to open the gate, means mounted on the plate for retaining the operating lever in position with the gate open, means connected to the ramp and the retaining means for the control lever that is actuated by a downward movement of the ramp for releasing the retaining means of the operating lever whereby the gate is returned to the closed position, and means connected to the ramp and the retaining means for the operating lever that is actuated by the weight of a vehicle on the ramp for returning the operating lever to its position with the gate closed.

3. In a gate actuator, the combination which comprises a post, a mounting plate positioned on the upper end of the post, a gate hinged to the post, a gate control lever pivotally mounted on the mounting plate, means connecting the extended end of the control lever to the gate, an operating lever also pivotally mounted on the mounting plate, a spring connecting ends of the control and operating levers, a spring connected to the gate at one end and mounting plate at the opposite end, dogs slidably mounted in the mounting plate for retaining the control and operating levers in operating positions, means for withdrawing one of the dogs for releasing the control lever, means for withdrawing another of the dogs for releasing the operating lever, and means for returning the operating lever and gate control lever to starting positions.

4. In a gate actuator, the combination which comprises a vertically disposed post, a gate having a hub positioned over the post for rotatably mounting the gate on the post, a mounting plate positioned on the upper end of the post, a gate control lever pivotally mounted on the mounting plate, a cable connecting the extending end of the control lever to the gate at a point spaced from the post, a dog slidably mounted in the mounting plate and positioned in the path of the control lever to retain the control lever in a position wherein the gate is closed, a ramp positioned below the gate and extended therefrom, means connected to the ramp and to the dog that is actuated by the weight of a vehicle on the ramp for withdrawing the dog for retaining the control lever in position with the gate closed, an operating lever pivotally mounted on the mounting plate, a spring connecting ends of the operating lever and control lever, a spring extended between the gate and mounting plate, means for retaining the operating lever in position with the gate closed, means for releasing the operating lever, and means actuated by the weight of a vehicle on the ramp for returning the operative lever.

References Cited in the file of this patent

UNITED STATES PATENTS

| | | |
|---|---|---|
| 308,752 | Cook | Dec. 2, 1884 |
| 1,274,278 | King | July 30, 1918 |
| 2,557,857 | Baxter | June 19, 1951 |